United States Patent [19]
Krueger

[11] 4,171,191
[45] Oct. 16, 1979

[54] APPARATUS FOR TRANSFERRING METERED QUANTITIES OF MATERIAL FROM ONE LOCATION TO ANOTHER

[76] Inventor: Wallace F. Krueger, 4401 Merriweather Rd., Toledo, Ohio 43623

[21] Appl. No.: 901,689

[22] Filed: May 1, 1978

Related U.S. Application Data

[63] Continuation-in-part of Ser. No. 815,527, Jul. 14, 1977, Pat. No. 4,118,799, which is a continuation of Ser. No. 670,137, Mar. 25, 1976, abandoned.

[51] Int. Cl.² ............... F04B 21/00; G05D 11/00
[52] U.S. Cl. .................. 417/539; 366/161; 366/162
[58] Field of Search .......... 417/343, 529, 533, 539, 417/900; 366/160, 161, 162, 131

[56] References Cited

U.S. PATENT DOCUMENTS

| | | | |
|---|---|---|---|
| 202,178 | 4/1878 | Lancy | 417/533 |
| 268,676 | 12/1882 | Hopkins | 417/533 |
| 291,859 | 1/1884 | Crawford | 417/533 X |
| 543,954 | 8/1895 | Wistrand | 417/529 X |
| 1,611,703 | 12/1926 | Zabriskie | 417/539 X |
| 2,142,062 | 12/1938 | Thurman | 366/161 |
| 3,123,342 | 3/1964 | Little | 366/162 |
| 3,289,607 | 12/1966 | Delligatti | 417/900 X |
| 3,684,250 | 8/1972 | Roeser | 366/161 |

*Primary Examiner*—Carlton R. Croyle
*Assistant Examiner*—Leonard E. Smith
*Attorney, Agent, or Firm*—Allen D. Gutchess, Jr.

[57] ABSTRACT

Apparatus is provided for moving controlled quantities of a material from one location to another and increasing the pressure thereof. The apparatus includes at least two cylinders having rams reciprocable therein. The rams are driven by a rocker arm which is pivotally connected to outer ends of both rams and is pivotally supported at a position therebetween. The arm is driven through a fluid-operated cylinder having a piston rod connected to one end of the arm, thereby reciprocating the rams in opposite directions. The ram cylinders have inlets connected to a source of the material under low positive pressure with a ball check valve located between the source and each inlet. Outlets of these cylinders are connected to a common outlet with a ball check valve also located between the common outlet and each cylinder outlet. The valves are arranged so that the inlet check valves and the outlet check valves operate in opposing relationship to provide positive opening and closing action and a precise flow of material. An adjustable back-pressure valve places back pressure on the material at the outlet with the pressure exceeding the pressure of the material at the source.

6 Claims, 4 Drawing Figures

APPARATUS FOR TRANSFERRING METERED QUANTITIES OF MATERIAL FROM ONE LOCATION TO ANOTHER

This is a continuation-in-part of my copending U.S. patent application Ser. No. 815,527, filed July 14, 1977, now U.S. Pat. No. 4,118,799 which is a continuation of my copending U.S. patent application Ser. No. 670,137, filed Mar. 25, 1976, now abandoned.

This invention relates to apparatus for pumping metered quantities of materials from one location to another while raising the pressure thereof.

While the apparatus according to the invention is particularly advantageous for moving precise quantities of highly viscous materials, it is also effective for low viscosity materials, as long as the outlet pressure exceeds the inlet pressure. The apparatus employs substantially maintenance-free, self-cleaning check valves and only two seals, one for each of two cylinders, are required for the overall system. The apparatus can also pump two or more materials in a precise volumetric ratio.

More specifically, the apparatus according to the invention includes at least one pair of cylinders in which rams are located, with drive means for reciprocating the rams in opposite directions in the cylinders. A source of material under low pressure communicates with inlets at the blind ends of the cylinders through inlet lines, each of which has a ball check valve for enabling the flow of the material only toward the respective cylinder. A common outlet line communicates with outlets at the opposite ends of the cylinders through outlet lines, each of which also has a ball check valve enabling flow of the material only away from the respective cylinder. The ball check valves are arranged so as to be power operated, in effect, by the inlet and outlet pressures, as will be discussed subsequently in detail. The valves also act with a quick, positive action to provide accurate quantities of the material through each of the cylinders.

The rams of the cylinders are reciprocated in opposite directions by means of a rocker arm which is pivotally connected to the rams and is pivotally supported at a point therebetween. The rocker arm can be oscillated or rocked through a fluid-operated cylinder which is connected to an outer end of the rocker arm and suitably powered by a source of fluid under pressure. In a preferred form, the pivotal engagement of the rocker arm with the rams can be changed relative to the pivotal support, thereby changing the length of stroke of the rams and, consequently, the quantities of material being pumped. If desired, a second material can be pumped through a second pair of cylinders and rams which are also mounted on the rocker arm in predetermined positions relative to the pivot support and to the pivotal engagements with the first rams. A precise ratio of the second material to the first one can then be achieved and maintained. Of course, more than two pairs of cylinders and rams can be employed if the need arises for additional material.

The common outlet line for each pair of cylinders has an adjustable back-pressure valve by means of which the back pressure of the metered material can be controlled. Particularly when two or more materials are metered by two or more pairs of cylinders, the materials are combined at a receiver, such as a mixing head. Adjustable back-pressure valves are then located in the outlet lines for the materials near the mixing head. In this instance, recirculating lines are provided to recirculate each material back to its source from its outlet line when the mixed materials are not being dispensed from the mixing head. Each recirculating line then has an adjustable back-pressure valve to maintain the same pressure on the material at the outlet line whether it is being directed to the mixing head or being recirculated.

It is, therefore, a principal object of the invention to provide apparatus for moving precise quantities of material from one location to another and for raising the pressure thereof.

Another object of the invention is to provide apparatus for metering materials, which apparatus includes adjustable back-pressure valve means for controlling the pressure of the metered material.

Yet another object of the invention is to provide an improved valve system for metering material by the use of cylinders and rams.

Other objects and advantages of the invention will be apparent from the following detailed description of preferred embodiments thereof, reference being made to the accompanying drawings, in which.

The apparatus according to the invention is particularly designed to pump and meter highly viscous materials, such as viscous resins that are also heavily loaded with fillers, such as calcium carbonate, aluminum hydrate, or glass-reinforcing fibers. Further, the apparatus requires minimal maintenance. Only two seals which are subject to wear are employed for the overall system and the flow of the viscous material through the system is designed to render the system substantially self-cleaning. Consequently, frequent repairs and cleaning are not necessary.

Figure 1:
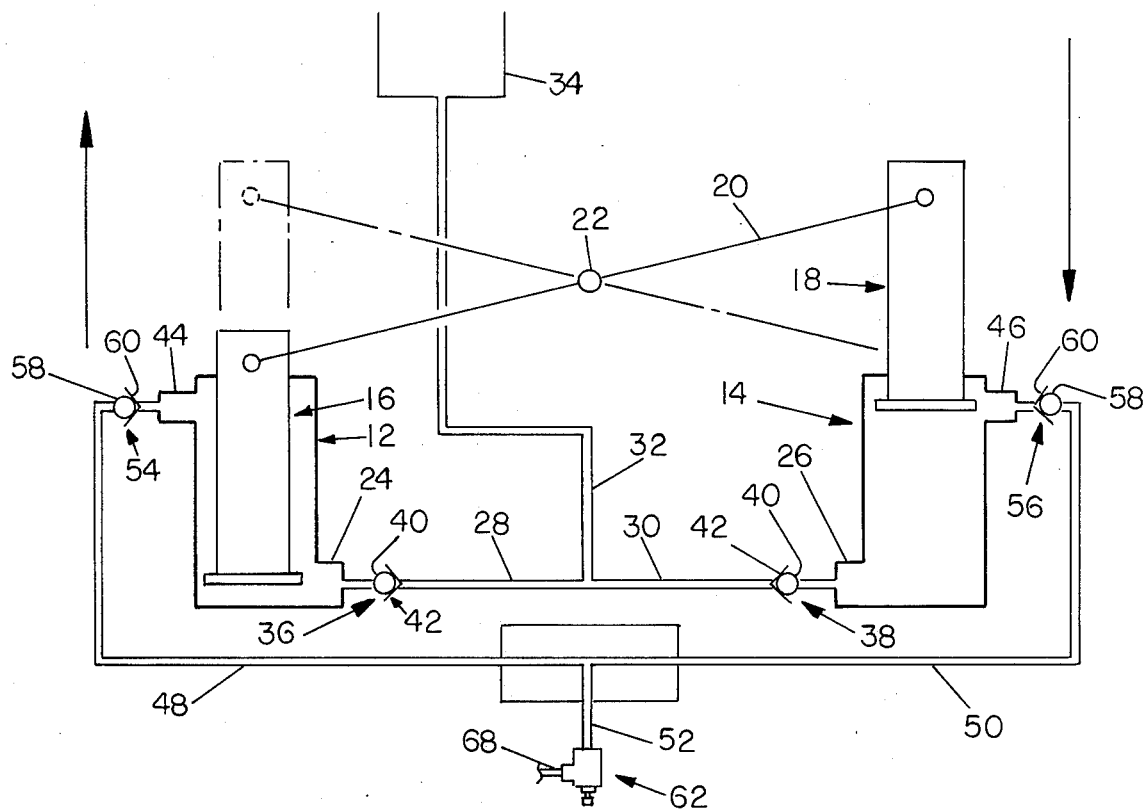
FIG. 1 is a diagrammatic view of apparatus for moving or transferring quantities of metered material from one location to another in accordance with the invention.

Referring to FIG. 1, apparatus according to the invention includes two cylinders 12 and 14 in which are reciprocated rams 16 and 18. The rams are preferably reciprocated in the cylinders by a lever or rocker arm 20 which is centrally pivotally supported by a pin 22 at equal distances from the rams. Consequently, the rams 16 and 18 reciprocate through equal strokes in opposite directions.

The cylinders 12 and 14 have inlets 24 and 26 at the blind ends thereof. These inlets are connected by inlet lines 28 and 30 and a common inlet supply line 32 to a suitable source 34 of a material to be transferred and metered. The material of the source 34 is maintained under low pressure. In this instance, the pressure is achieved by virtue of the supply source 34 being positioned above the cylinders 12 and 14. Otherwise, the material can be maintained in a closed supply container under pressure or can be pumped at lower pressure through the inlet supply line 32 to the supply lines 28 and 30. The inlet lines 28 and 30 contain ball check valves 36 and 38, each of which includes a ball 40 and a seat 42, to permit flow only toward the cylinders. The balls can be spring loaded, if desired, although this is not necessary.

The cylinders 12 and 14 also have outlets 44 and 46 to which outlet lines 48 and 40 are connected. The outlet lines 48 and 50 communicate with a common outlet line 52 which can direct the metered, higher pressure material to any suitable location. Ball check valves 54 and 56 are located in the outlet lines 48 and 50 to direct the material in the lines 48 and 50 only away from the cylinders 12 and 14. Each of the ball check valves 54 and 56 has a ball 58 and a seat 60.

The pressure of the material in the outlet line 52 must exceed that in the inlet supply line 32 or the flow of the material through the cylinders 12 and 14 will be inaccurate and, in fact, flow through the cylinders can occur without reciprocation of the rams 16 and 18 at all. In some instances, to assure sufficient pressure in the outlet line 52 and the lines 48 and 50, an adjustable back-pressure valve 62 is provided in the outlet line 52.

The operation of the systems of FIG. 1 will now be discussed in more detail. Assuming that the ram 16 is moving upwardly, as indicated by the arrow, the viscous material will be drawn through the inlet line 28 past the check valve 36 from the source 34. During this movement, the pressure in the outlet line 30 for the cylinder 14 will tend to be lowered and, therefore, the check valve 38 will tend to be urged even more completely closed. At the same time, the ram 18 is moving downwardly, as indicated by the arrow, to force the material out of the cylinder 14 and past the check valve 56. This material will flow through the outlet line 50 and, since this communicates with the outlet line 48, the pressure therein will increase to tend to more completely close the check valve 54 for the outlet of the cylinder 12.

From the above, it will be seen that the check valves are powered, in effect, by virtue of the pressures in the system. This assures accurate and precise opening and closing of the check valves to aid in assuring that precise, metered quantities of the materials will be moved to the common outlet line 52 from the source 34. The precision of the metering rams is enhanced due to the quick, positive action of the check valves at the precise time of cycle reversal. This is particularly important when viscous resins with high loadings of abrasive fillers are being pumped since quick and responsive valve action is particularly needed in those instances. By using this pressure to power operate the check valves, separate power arrangements, such as involving separate air, oil, or mechanically-powered valves with the necessary circuitry, can be eliminated completely. The simplified piping involved also eliminates additional heat loads that may otherwise be incurred with alternate powered valve systems. With the viscous materials in particular, heat generation should be kept to a minimum in order to extend the life of the seals employed and to prevent premature catalytic reaction when materials subject to such are being pumped.

Figure 2:
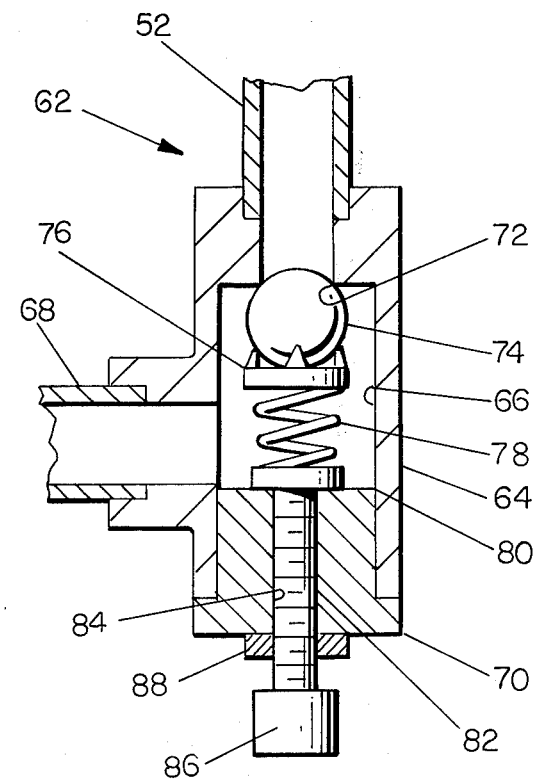
FIG. 2 is an enlarged view in cross section taken through an adjustable back-pressure valve of FIG. 1.

The adjustable back-pressure valve 62 is shown in more detail in FIG. 2. The valve includes a housing 64 forming an inner chamber 66 communicating with the outlet line 52 and an additional outlet line 68. One end of the chamber is closed off by a plug 70 and the other end of the chamber, communicating with the line 52, has a seat 72 formed by the housing 64. A valve ball 74 is urged against the seat 72 by a spring retainer 76 and a spring 78. The other end of the spring 78 seats against a disc retainer 80 connected to a threaded shank 82. The shank 82 extends through a threaded passage 84 in the plug 70, terminating outside of the plug in an adjusting knob 86, and a lock nut 88 holds the threaded shank 82 in a desired position.

When the knob 86 is turned to move the shank 82 toward the chamber 66, the compressive force on the spring 78 is increased to increase the pressure of the ball 74 against the seat 72. Thus, more pressure of the metered material in the common outlet line 52 is required to unseat the ball so that the back pressure on the metered material is accordingly higher. Turning the knob 86 in the opposite direction produces the opposite effect on the back pressure of the metered material. As discussed previously, it is important that the back pressure of the metered material in the outlet line always exceeds the positive pressure of the material at the source 34.

Figure 3:
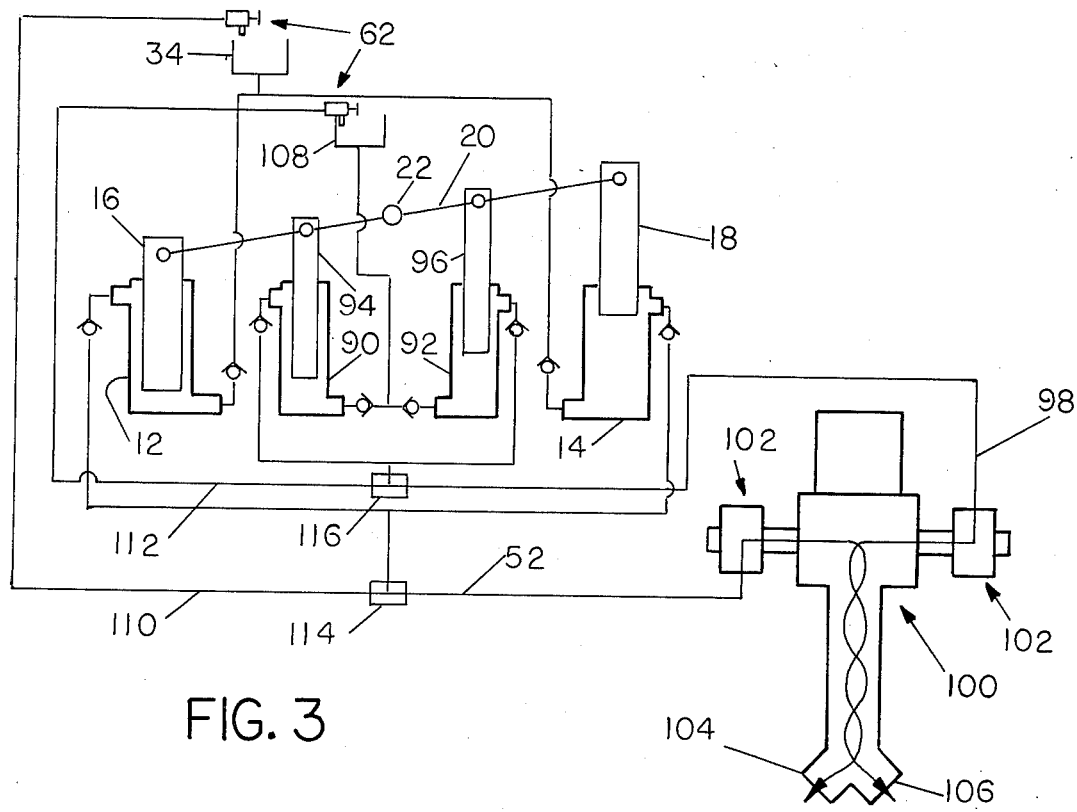
FIG. 3 is a diagrammatic view of the apparatus of FIG. 1 modified by the addition of more components and mixing means for two metered materials.

A specific application for the transfer metering system or apparatus embodying the invention is shown in FIG. 3, by way of further illustration. In this instance, two additional cylinders 90 and 92 and two additional rams 94 and 96 are employed. As shown, the additional cylinders and rams are located closer to the pivot point 22 and are also smaller diameter than the cylinders 12 and 14. With the resulting shorter storkes for the rams 94 and 96 and the smaller diameters for the cylinders 90 and 92 and the rams 94 and 96, the output thereof can be substantially less than the output of the cylinders 12 and 14 and the rams 16 and 18. With this arrangement, it is possible to obtain precise and very high ratios of the materials moved by the two systems, in the order of 100 to 1 by way of example. Further, high viscosity materials and low viscosity ones can be handled by the same system. Also, when higher outputs are desired, all four of the cylinders can handle the same material. Of course, it will be readily understood that even more than two pair of the cylinders and rams can be employed if desired, such as if coloring is to be added to the first two materials, for example.

In this instance, the metered materials from the two pairs of cylinders are supplied through the outlet line 52 and an additional outlet line 98 to a mixing head indicated at 100. This mixing head can be of the type shown in my U.S. Pat. No. 3,920,223, issued on Nov. 18, 1975. Particularly for highly-filled resins, the recirculation shown in that patent is preferably eliminated and back-pressure valves indicated at 102 are employed at the inlet ports of the mixing head. The back pressure valves 102 are preferably adjusted so that the pressures of the metered materials entering the mixing head 100 are equal when viscosities are similar. When the materials have different viscosities, the one at higher viscosity is maintained under higher pressure. After the metered materials are mixed within the mixing head, the combined material can be supplied through two outlets 104 and 106 to points of use.

When the combined material is not being dispensed by the mixing head 100, the metered materials are recirculated back to the source 34 for the cylinders 12 and 14 and a source 108 for the cylinders 90 and 92. This is accomplished through recirculating outlet lines 110 and 112 communicating with the outlet lines 52 and 98 through three-way walves 114 and 116.

The outlet lines 110 and 112 have the adjustable back pressure valves 62 therein, preferably near the sources 34 and 108 so that back pressure is always maintained in the lines 110 and 112. Similarly, back pressure is always maintained in the lines 52 and 98 due to the fact that the adjustable back pressure valves 102 are located at the entrances to the mixing head 100. This is an important feature in that it always enables immediate accurate dispensing to be achieved when the valves 114 and 116 are turned to supply the metered materials through the lines 52 and 98.

The back-pressure valves 62 are also adjusted so that the back pressure in the recirculating outlet lines 110 and 112 is equal to the pressure of the metered material in the outlet lines 52 and 98. This assures that the accurate ratio between the two materials will be maintained constant whether the valves 114 and 116 are turned to move the metered materials through the lines 52 and 98 or through the recirculating lines 110 and 112.

Figure 4:
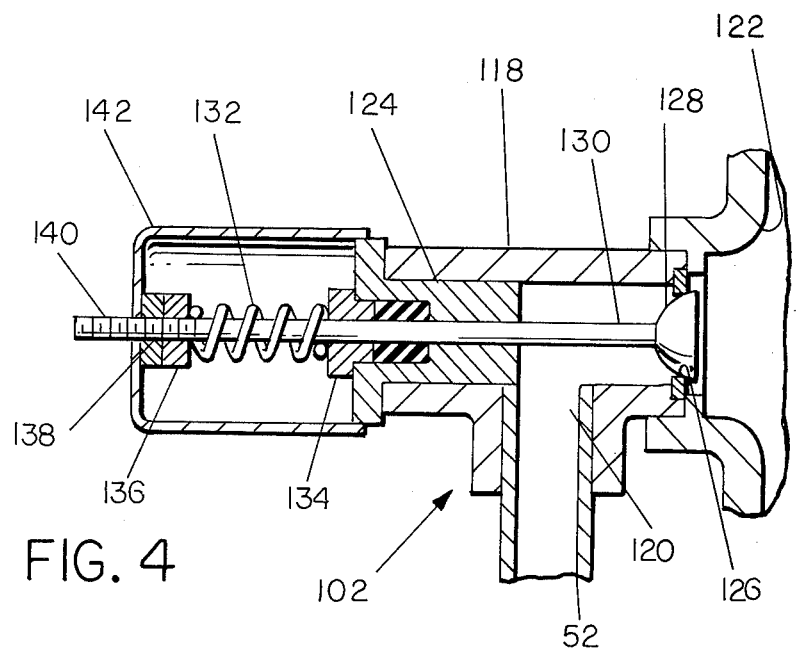
FIG. 4 is an enlarged view in cross section taken through an adjustable back-pressure valve of FIG. 3.

One of the valves 102 is shown in more detail in FIG. 4. The valve includes a housing 118 forming a chamber 120 communicating with the outlet line 52 or 98 and with an entrance opening 122 of the mixing head 100. A plug 124 closes one end of the chamber 120 and the other end has a seat 126 formed by the housing 118. A ball or semi-spherical surface 128 at the end of a valve stem 130 bears against the seat 126 when a spring 132 urges the stem 130 toward the left, as shown in FIG. 4. The spring 132 seats against a seal 134 at the plug 124 and the opposite end of the spring seats against an adjusting nut 136 and a lock nut 138 mounted on a threaded end 140 of the stem 130. A suitable cover 142 can be provided for the spring, if desired. When the nuts 136 and 138 are turned further onto the stem 130, the tension on the spring 132 is increased to urge the surface 128 harder against the seat 126. The back pressure in the line 52 or 98 thus increases. The opposite occurs when the nuts are turned in the opposite direction.

Various modifications of the above-described embodiments of the invention will be apparent to those skilled in the art and it is to be understood that such modifications can be made without departing from the scope of the invention, if they are within the spirit and the tenor of the accompanying claims.

I claim:

1. Apparatus for metering viscous material comprising means for establishing a source of material at positive pressure above atmospheric pressure, an outlet where the material is at a higher pressure, a first cylinder having a first ram reciprocable therein, first inlet means connecting said source of positive pressure material with said first cylinder, said first inlet means having first check valve means enabling flow of the material only toward said first cylinder, first outlet means connecting said first cylinder with said outlet, said first outlet means having second check valve means enabling flow of the material only away from said first cylinder, a second cylinder having a second ram reciprocable therein, second inlet means connecting said source of positive pressure material with said second cylinder, said second inlet means having third check valve means enabling flow of the material only toward said second cylinder, second outlet means connecting said second cylinder with said outlet, said second outlet means having fourth check valve means enabling flow of material only away from said second cylinder, an adjustable back-pressure valve through which the metered material must flow for establishing an adjustable back pressure of the metered material at said outlet, and means for reciprocating said first and second rams in said first and second cylinders.

2. Apparatus for moving and metering first and second different viscous materials from first and second sources of materials at positive pressures above atmospheric pressure to first and second outlets where the materials are at higher pressures, said apparatus comprising a first cylinder having a first ram reciprocable therein, first inlet means connecting said first source of positive pressure material with said first cylinder, said first inlet means having first check valve means enabling flow of the first material only toward said first cylinder, first outlet means connecting said first cylinder with said first outlet, said first outlet means having second check valve means enabling flow of the first material only away from said first cylinder, a second cylinder having a second ram reciprocable therein, second inlet means connecting said first source of positive pressure material with said second cylinder, said second inlet means having third check valve means enabling flow of the first material only toward said second cylinder, second outlet means connecting said second cylinder with said first outlet, said second outlet means having fourth check valve means enabling flow of the first material only away from said second cylinder, a first adjustable back-pressure valve through which metered material from the first source must flow for establishing an adjustable back pressure of the material at said first outlet, a third cylinder having a third ram reciprocable therein, third inlet means connecting said second source of positive pressure material with said third cylinder, said third inlet means having fifth check valve means enabling flow of the second material only toward said third cylinder, third outlet means connecting said third cylinder with said second outlet, said third outlet means having sixth check valve means enabling flow of the second material only away from said third cylinder, a fourth cylinder having a fourth ram reciprocable therein, fourth inlet means connecting said second source of positive pressure material with said fourth cylinder, said fourth inlet means having seventh check valve means enabling flow of the second material only toward said fourth cylinder, fourth outlet means connecting said fourth cylinder with said second outlet, said fourth outlet means having eighth check valve means enabling flow of the second material only away from said fourth cylinder, a second adjustable back-pressure valve through which metered material from the second source must flow for establishing an adjustable back pressure of the material at said second outlet, and means for reciprocating said first and second rams in opposite directions and for reciprocating said third and fourth rams in opposite directions.

3. Apparatus for metering viscous material comprising means for establishing a source of material at positive pressure above atmospheric pressure, an outlet where the material is at a higher pressure, a first cylinder having a first ram reciprocable therein, first inlet means connecting said source of positive pressure material with said first cylinder, said first inlet means having first check valve means enabling flow of the material only toward said first cylinder, first outlet means connecting said first cylinder with said outlet, said first outlet means having second check valve means enabling flow of the material only away from said first cylinder, a second cylinder having a second ram reciprocable therein, second inlet means connecting said source of positive pressure material with said second cylinder, said second inlet means having third check valve means enabling flow of the material only toward said second cylinder, second outlet means connecting said second cylinder with said outlet, said second outlet means having fourth check valve means enabling flow of material only away from said second cylinder, a mixing head having an entrance opening, an outlet line connecting said outlet and said entrance opening, and an adjustable back-pressure valve located in said outlet line through which the metered material must flow for establishing adjustable back pressure of the material at said outlet and in said outlet line, and means for reciprocatng said first and second rams in said first and second cylinders.

4. Apparatus according to claim 3 characterized by a recirculating line connecting said outlet line and said source, and a second adjustable back pressure valve in said recirculating line through which metered material must flow when being recirculated for establishing back pressure of the material at said outlet regardless of whether the material is flowing to said mixing head or being recirculated.

5. Apparatus for moving and metering first and second different viscous materials from first and second sources of materials at positive pressures above atmospheric pressure to first and second outlets where the materials are at higher pressures, said apparatus comprising a first cylinder having a first ram reciprocable therein, first inlet means connecting said first source of postive pressure material with said first cylinder, said first inlet means having first check valve means enabling flow of the first material only toward said first cylinder, first outlet means connecting said first cylinder with said first outlet, said first outlet means having second check valve means enabling flow of the first material only away from said first cylinder, a second cylinder having a second ram reciprocable therein, second inlet means connecting said first source of positive pressure material with said second cylinder, said second inlet means having third check valve means enabling flow of the first material only toward said second cylinder, second outlet means connecting said second cylinder with said first outlet, said second outlet means having fourth check valve means enabling flow of the first material only away from said second cylinder, a mixing head having first and second entrance openings, a first outlet line connecting said first outlet and said first entrance opening, a first adjustable back-pressure valve located in said first outlet line near said first entrance opening through which metered material must flow for establishing adjustable back pressure of the material at said first outlet and in said first outlet line, a third cylinder having a third ram reciprocable therein, third inlet means connecting said second source of positive pressure material with said third cylinder, said third inlet means having fifth check valve means enabling flow of the second material only toward said third cylinder, third outlet means connecting said third cylinder with said second outlet, said third outlet means having sixth check valve means enabling flow of the second material only away from said third cylinder, a fourth cylinder having a fourth ram reciprocable therein, fourth inlet means connecting said second source of positive pressure material with said fourth cylinder, said fourth inlet means having seventh check valve means enabling flow of the second material only toward said fourth cylinder, fourth outlet means connecting said fourth cylinder with said second outlet, said fourth outlet means having eighth check valve means enabling flow of the second material only away from said fourth cylinder, a second outlet line connecting said second outlet and said second entrance opening, a second adjustable back-pressure valve located in said second outlet line through which metered material must flow for establishing adjustable back pressure of the material at said second outlet and in said second outlet line, and means for reciprocating said first and second rams in opposite directions and for reciprocating said third and fourth rams in opposite directions.

6. Apparatus according to claim 5 characterized by a first recirculating line connecting said first outlet line and said first source, a third adjustable back-pressure valve in said first recirculating line through which metered material must flow when being recirculated for establishing back pressure of the material at said first outlet when the material is being recirculated, a second recirculating line connecting said second outlet line and said second source, and a fourth adjustable back-pressure valve in said second recirculating line through which metered material must flow when being recirculated for establishing back pressure of the material at said second outlet when the material is being recirculated.

* * * * *